(12) United States Patent
Ahn

(10) Patent No.: US 10,757,553 B2
(45) Date of Patent: Aug. 25, 2020

(54) ELECTRONIC DEVICE AND SYSTEM FOR PROVIDING CONTENT AND METHOD OF PROVIDING CONTENT

(71) Applicant: Samsung Electronics Co., Ltd., Suwon-si, Gyeonggi-do (KR)

(72) Inventor: Chan Su Ahn, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 41 days.

(21) Appl. No.: 15/683,052

(22) Filed: Aug. 22, 2017

(65) Prior Publication Data
US 2018/0054692 A1 Feb. 22, 2018

(30) Foreign Application Priority Data

Aug. 22, 2016 (KR) .................. 10-2016-0106042

(51) Int. Cl.
| | | |
|---|---|---|
| *H04L 29/08* | (2006.01) | |
| *H04W 4/60* | (2018.01) | |
| *H04W 4/50* | (2018.01) | |
| *H04M 1/725* | (2006.01) | |
| *H04W 4/80* | (2018.01) | |
| *H04W 8/24* | (2009.01) | |

(52) U.S. Cl.
CPC .............. *H04W 4/60* (2018.02); *H04L 67/34* (2013.01); *H04M 1/7253* (2013.01); *H04W 4/50* (2018.02); *H04W 4/80* (2018.02); *H04W 8/24* (2013.01)

(58) Field of Classification Search
CPC ...................................................... H04L 67/34
See application file for complete search history.

(56) References Cited

U.S. PATENT DOCUMENTS

| | | | |
|---|---|---|---|
| 7,299,196 B2 | 11/2007 | Lee | |
| 7,761,052 B2 | 7/2010 | Oh et al. | |
| 9,661,495 B2 | 5/2017 | Hawkins et al. | |
| 9,734,307 B2 * | 8/2017 | Yi | ............................ G06F 8/61 |
| 9,900,767 B2 | 2/2018 | Hawkins et al. | |

(Continued)

FOREIGN PATENT DOCUMENTS

| | | |
|---|---|---|
| KR | 10-2002-0007885 A | 1/2002 |
| KR | 20090110874 A | 10/2009 |

(Continued)

OTHER PUBLICATIONS

European Search Report dated Mar. 15, 2019; European Appln. No. 17843924.6-1213 / 3455820.

*Primary Examiner* — Adnan M Mirza

(74) *Attorney, Agent, or Firm* — Jefferson IP Law, LLP

(57) ABSTRACT

An electronic device is provided. The electronic device includes a display, a communication circuit communicating with a server through a network, and a processor that is electrically connected with the display, and the communication circuit. The processor is configured to transmit identification information of the electronic device and a request for transmitting content corresponding to the identification information to the server using the communication circuit when the electronic device is first connected with the network, receive the content corresponding to the identification information from the server using the communication circuit, and output the content corresponding to the identification information on the display.

20 Claims, 10 Drawing Sheets

(56) References Cited

U.S. PATENT DOCUMENTS

| | | |
|---|---|---|
| 10,015,668 B2 | 7/2018 | Hawkins et al. |
| 2002/0010653 A1 | 1/2002 | Lee |
| 2006/0288091 A1 | 12/2006 | Oh et al. |
| 2010/0017724 A1 | 1/2010 | Wang et al. |
| 2012/0030187 A1* | 2/2012 | Marano ............... G06F 21/6218 707/709 |
| 2014/0359023 A1 | 12/2014 | Homsany |
| 2015/0189494 A1 | 7/2015 | Idsinga et al. |
| 2016/0066178 A1 | 3/2016 | Hawkins et al. |
| 2016/0124626 A1 | 5/2016 | Lee et al. |
| 2017/0041448 A1 | 2/2017 | Idsinga et al. |
| 2017/0257756 A1 | 9/2017 | Hawkins et al. |
| 2018/0146366 A1 | 5/2018 | Hawkins et al. |
| 2019/0037393 A1 | 1/2019 | Hawkins et al. |

FOREIGN PATENT DOCUMENTS

| | | |
|---|---|---|
| KR | 20150054627 A | 5/2015 |
| WO | 2012-075800 A1 | 6/2012 |

\* cited by examiner

ELECTRONIC DEVICE AND SYSTEM FOR PROVIDING CONTENT AND METHOD OF PROVIDING CONTENT

CROSS-REFERENCE TO RELATED APPLICATION(S)

This application claims the benefit under 35 U.S.C. § 119(a) of a Korean patent application filed on Aug. 22, 2016 in the Korean Intellectual Property Office and assigned Serial number 10-2016-0106042, the entire disclosure of which is hereby incorporated by reference.

TECHNICAL FIELD

The present disclosure relates to technology for providing content to an electronic device.

BACKGROUND

Owing to development of electronic technology, various electronics have been developed and used. In particular, a device which is wearable by a user, such as a smart-watch, smart-glasses, and the like, has propagated as well as an electronic device, such as a smartphone, a tablet personal computer (PC), and the like.

Upon selling the electronic device described above, a service in which various customized texts or images are imprinted on a housing of the electronic device for a customizing electronic device is provided. Meanwhile, as an interest on out-of-box experience (OOBE) is increased, a design which is capable of providing diverse experience to a user is provided when the electronic device is first opened.

However, since the wearable device such as the smart-watch has a small space for imprinting in comparison to the electronic device, such as the smartphone, the tablet PC, or the like, which has a large space for imprinting, it is hard for the wearable device to provide imprinting service described above. In addition, in the case of imprinting the electronic device, a monetary value of the electronic device is decreased. This may mean that imprinting the expensive electronic device is uncomfortable to the user.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device and system for providing a customized environment by automatically outputting content which a user desires at a specified time which the user desires after the electronic device is opened, and a method of providing the content.

In accordance with an aspect of the present disclosure, an electronic device is provided. The electronic device includes a display, a communication circuit communicating with a server through a network, and a processor that is electrically connected with the display and the communication circuit. The processor is configured to transmit identification information of the electronic device and a request for transmitting content corresponding to the identification information to the server using the communication circuit when the electronic device is first connected with the network, receive the content corresponding to the identification information from the server using the communication circuit, and output the content corresponding to the identification information on the display.

In accordance with another aspect of the present disclosure, a system for providing a message is provided. The system includes a server, and an electronic device that is connected with the server through a network. The server is configured to provide a web page obtaining content corresponding to the electronic device and to store the content corresponding to the electronic device obtained through the web page. The electronic device is configured to transmit a request for transmitting the content corresponding to the electronic device to the server and to output the content corresponding to the electronic device as the message through at least one of a display or a speaker when a specified condition is satisfied.

In accordance with another aspect of the present disclosure, a method of providing a message is provided. The method includes receiving, by a server, a request for ordering an electronic device from another electronic device, providing, by the server, a web page for obtaining content corresponding to the electronic device to the other electronic device, storing, by the server, the content obtained through the web page, identification information of the electronic device, and an output condition of the content, transmitting to the server, by the electronic device, the identification information and a request for transmitting the content if the electronic device is connected with a network, transmitting, by the server, the content to the electronic device if the output condition is satisfied, and outputting, by the electronic device, the content as the message.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
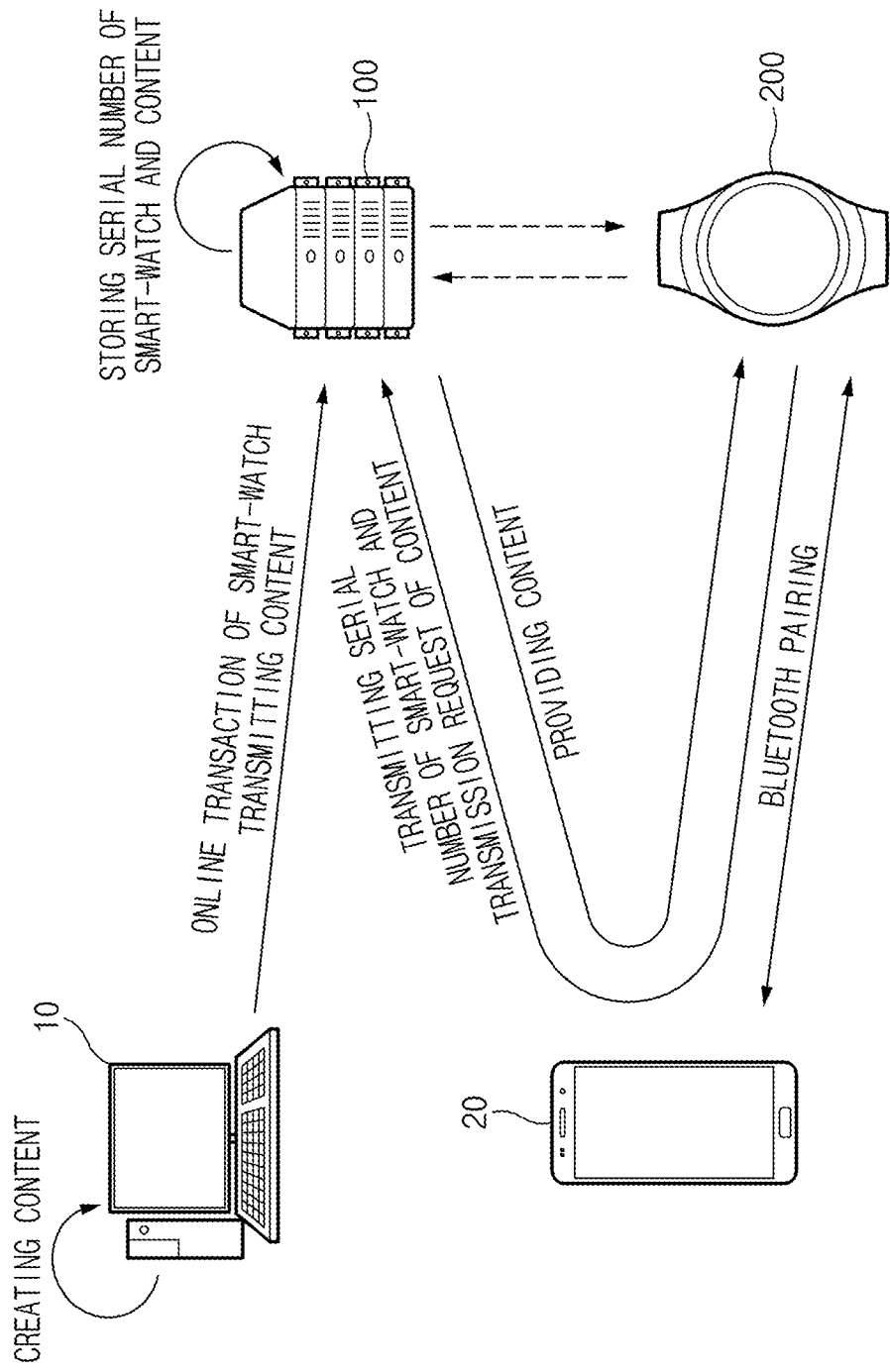
FIG. 1 illustrates an environment where an electronic device and a system are operated according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In this disclosure, the expressions "have", "may have", "include" and "comprise", or "may include" and "may comprise" used herein indicate existence of corresponding features (e.g., elements such as numeric values, functions, operations, or components) but do not exclude presence of additional features.

In this disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in this disclosure may be used to refer to various elements regardless of the order and/or the priority and to distinguish the relevant elements from other elements, but do not limit the elements. For example, "a first user device" and "a second user device" indicate different user devices regardless of the order or priority. For example, without departing the scope of the present disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used in this disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other components. For example, a "processor configured to (or set to) perform A, B, and C" may mean a dedicated processor (e.g., an embedded processor) for performing a corresponding operation or a generic-purpose processor (e.g., a central processing part (CPU) or an application processor (AP)) which performs corresponding operations by executing one or more software programs which are stored in a memory device.

All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of this disclosure. In some cases, even if terms are terms which are defined in this disclosure, they may not be interpreted to exclude embodiments of this disclosure.

An electronic device according to various embodiments of the present disclosure may include at least one of, for example, a smartphone, a tablet personal computer (PC), a mobile phone, a video phone, an e-book reader, a desktop PC, a laptop PC, a netbook computer, a workstation, a server, a personal digital assistant (PDA), a portable multimedia player (PMP), an Moving Picture Experts Group phase 1 or phase 2 (MPEG-1 or MPEG-2) audio layer 3 (MP3) player, a mobile medical device, a camera, or a wearable device. In various embodiments of the present disclosure, the wearable device may include at least one of an accessory-type wearable device (e.g., watches, rings, bracelets, anklets, necklaces, glasses, contact lenses or head-mounted-devices (HMD)), a textile/clothing-integrated wearable device (e.g., electronic clothing), a body-mounted wearable device (e.g., skin pads or tattoo), or a bio-implantable wearable device (e.g., implantable circuits).

In various embodiments of the present disclosure, the electronic device may be a home appliance. The home appliance may include at least one of, for example, a television (TV), a digital versatile disc (DVD) player, an audio player, a refrigerator, an air conditioner, a cleaner, an oven, a microwave oven, a washer, an air purifier, a set-top box, a home automation control panel, a security control panel, a TV box (e.g., a Samsung HomeSync™, an Apple TV™, or a Google TV™), a game console (e.g., Xbox™ or PlayStation™), an electronic dictionary, an electronic key, a camcorder or a digital photo frame.

In another embodiment of the present disclosure, the electronic device may include at least one of various medical devices (e.g., various portable medical meters (e.g., a blood glucose meter, a heart rate meter, a blood pressure meter, a temperature meter or the like), magnetic resonance angiography (MRA), magnetic resonance imaging (MRI), computed tomography (CT), a medical camcorder, an ultrasonic device or the like), a navigation device, a global navigation satellite system (GNSS), an event data recorder (EDR), a flight data recorder (FDR), an automotive infotainment device, a marine electronic device (e.g., a marine navigation device, a gyro compass or the like), avionics, a security device, a car head unit, an industrial or home robot, an automatic teller's machine (ATM) for banks, point of sales (POS) for shops, or an internet of things (IoT) device (e.g., an electronic bulb, various sensors, an electricity or gas meter, a sprinkler device, a fire alarm, a thermostat, a streetlamp, a toaster, fitness equipment, a hot-water tank, a heater, a boiler or the like).

In various embodiments of the present disclosure, the electronic device may include at least one of a part of the furniture or building/structure, an electronic board, an electronic signature receiving device, a projector, or various meters (e.g., meters for water, electricity, gas or radio waves). In various embodiments of the present disclosure, the electronic device may be one or a combination of the above-described devices. An electronic device according to some embodiments may be a flexible electronic device. An electronic device according to an embodiment of the present disclosure will not be limited to the above-described devices, and may include a new electronic device that is provided by the development of technology.

Hereinafter, an electronic device according to various embodiments of the present disclosure will be described with reference to the accompanying drawings. As used herein, the term "user" may refer to a person who uses the electronic device, or a device (e.g., an intelligent electronic device) that uses the electronic device.

FIG. 1 illustrates an environment where an electronic device and a system are operated according to an embodiment of the present disclosure.

Referring to FIG. 1, a first external device 10 (for the sake of convenience of explanation, hereinafter referred to as a "purchaser terminal") may perform an online transaction of an electronic device 200 (for the sake of convenience of explanation, hereinafter referred to as a "smart-watch 200"). The purchaser terminal 10 may create content to be output through the smart-watch 200, which is a target of the online transaction. The purchaser terminal 10 may transmit the created content to a server 100.

The server 100 may receive the content, which is for the smart-watch 200 purchased by the purchaser terminal 10. The server 100 may store the content. The server 100 may obtain a serial number (S/N) of the purchased smart-watch 200. The server 100 may obtain the S/N of the smart-watch 200 from the outside. The server 100 may store the content, in addition to the S/N. The server 100 illustrated in FIG. 1 as being a single device. However, embodiments of the present disclosure are not limited thereto. For example, the server 100 may be implemented with a plurality of devices. For example, the server 100 may include a web server, which performs an online transaction, and a content server, which stores the content and the S/N.

The purchased smart-watch 200 may be shipped to a recipient. The recipient may turn on (power on) the shipped smart-watch 200. The smart-watch 200 may be connected with a network after the power is turned on. The smart-watch 200 may communicate with the server 100 through the network.

According to an embodiment, the smart-watch 200 may be connected with a second external device 20 (for the sake of convenience of explanation, hereinafter referred to as a "recipient terminal 20") in a manner of Bluetooth. After the smart-watch is paired with the recipient terminal 20, the smart-watch 200 may communicate with the server 100 through the recipient terminal 20. According to an embodiment, the smart-watch 200 may communicate with the server 200 in the manner of Wi-Fi or cellular communication.

If the smart-watch 200 is connected with the network for the first time, the smart-watch 200 may transmit the S/N of the smart-watch 100 and a request for transmitting the content, to the server 100. The server 100 may provide the content, which corresponds to the received S/N, to the smart-watch 200 in response to the transmission request. The smart-watch 200 may output the provided content through a display or a speaker.

FIG. 1 illustrates that the first external device 10 is a desktop computer. However, embodiments of the present disclosure are not limited thereto. For example, the first external device 10 may be one of various computing devices, which are capable of performing the online transaction, and creating and transmitting the content, such as a laptop computer, a smartphone, a tablet PC, or the like. In addition, the second external device 20 is illustrated in FIG. 1 as being the smartphone. However, embodiments of the present disclosure are not limited thereto. For example, the second external device 20 may be one of various computing devices, which are capable of being paired with the electronic device 200 in the manner of Bluetooth or communicating with the server 100. In addition, the smart-watch 200 in FIG. 1 may be substituted for one of various computing devices which are capable of communicating with the server 100 and outputting content, such as a smartphone, a tablet PC, different kinds of wearable devices, or the like.

Figure 2:
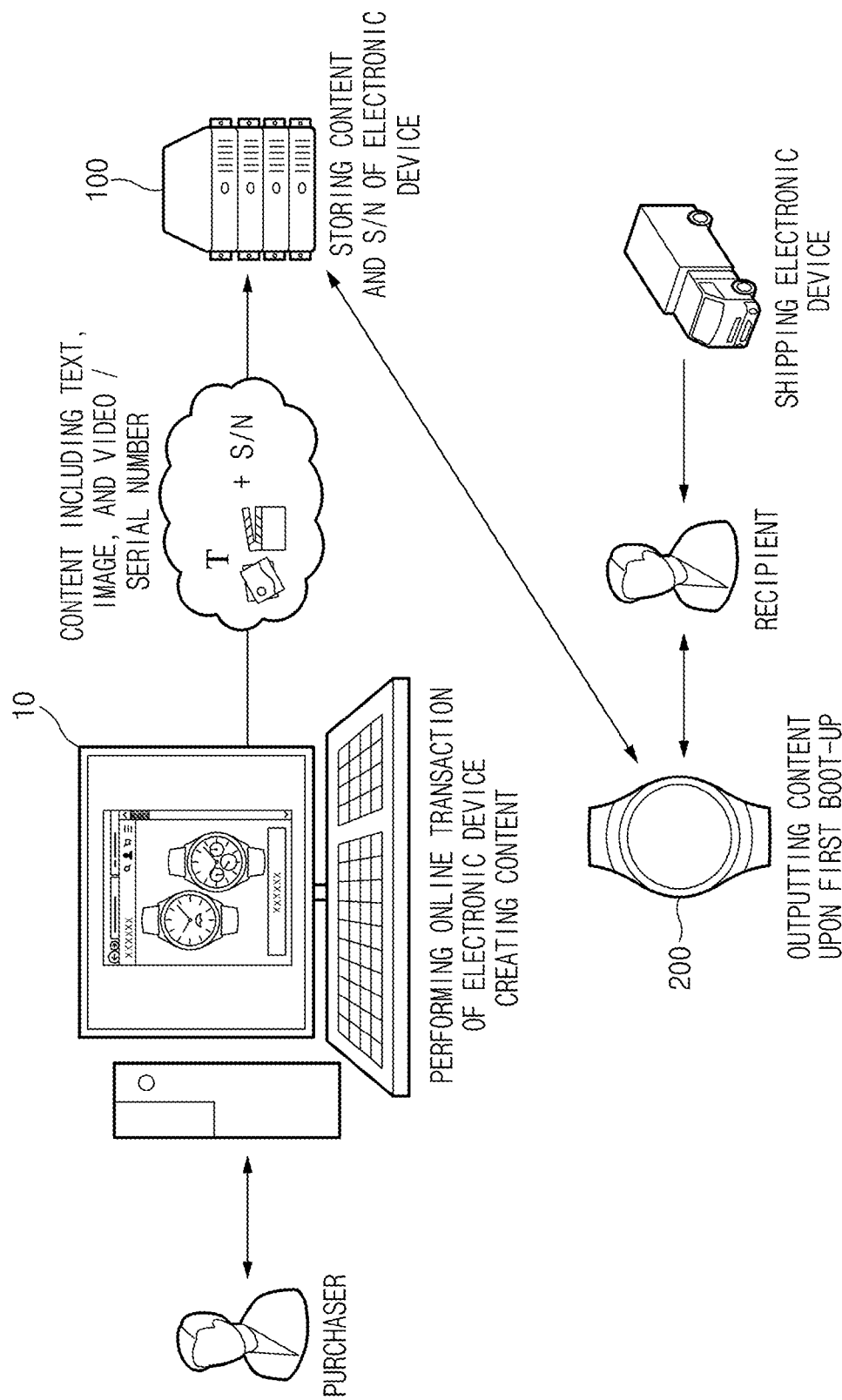
FIG. 2 illustrates an environment where an electronic device and a system are operated according to an embodiment of the present disclosure.

FIG. 2 illustrates an environment where an electronic device and a system are operated according to an embodiment of the present disclosure.

Referring to FIG. 2, a purchaser may perform an online transaction of the electronic device using the first external device 10. The electronic device 200 which is a target of the online transaction may be shipped to a recipient who is specified by the purchaser. The purchaser and the recipient may be the same as or be different from the each other. The purchaser may create content, which the purchaser wants to send to the recipient, using the first external device 10. For example, in the case where the purchaser buys the electronic device 200 for celebration of the recipient, the content including a congratulation message that the purchaser wants to send to the recipient may be created. The content may be a welcoming message. In the case of turning on the electronic device 200 for the first time or in the case of meeting a specified condition after the electronic device 200 is turned on for the first time, the welcoming message may be output through the electronic device 200. The purchaser may set a condition in which the content is output from the electronic device 200 using the first external device 10. For example, the purchaser may set a condition in which the content is output if the electronic device 200 is connected with the network for the first time.

The first external device 10 may perform the online transaction of the electronic device 200 and may create the content. The content, for example, may include a text, an image, a video, and/or the like. The first external device 10 may transmit the content and an S/N of the electronic device 200, which is a target of the online transaction, to the server 100. The S/N of the electronic device 200 to be shipped to the recipient may be decided after purchase decision of the electronic device 200. The first external device 10 may receive the S/N from a web server 100, which provides the online transaction. The first external device 10 may transmit an output condition of the content to the server 100, in addition to the content and the S/N.

The server 100 may receive and may store the content and the S/N of the electronic device 200. The server 100 may store the content and the S/N after the content and the S/N are matched. The server 100 may receive and may store the output condition of the content, in addition to the content and the S/N. The server 100 may store the content, the S/N, and the output condition after the content, the S/N, and the output condition are matched.

After the online transaction is performed, the electronic device 200 which is a target of the online transaction may be shipped to the recipient. The recipient may turn on (power on) the shipped electronic device 200. If the electronic device 200 is booted up and is connected with the network, the electronic device 200 may transmit the S/N of the electronic device 200 and the transmission request of the content from the server 100. For example, in the case where the electronic device 200 is booted up for the first time, the S/N and the transmission request may be transmitted to the server 100.

If the output condition is satisfied, the server 100 may provide the content, which corresponds to the received S/N, to the electronic device 200. For example, in the case where the condition is set such that the content is output, if the electronic device 200 is connected with the network for the first time, the server 100 may provide the content to the electronic device 200, immediately. For another example, in the case where the condition is set such that the content is output on a specified date, the server 100 may provide the content to the electronic device 200 if the specified date arrives.

The electronic device 200 may output the provided content. The electronic device 200 may output the content as a welcoming message. For example, the electronic device 200 may output the content as the welcoming message including a congratulation message, which is created by the purchaser, on a display of the electronic device 200.

As described above, in the case where the content, which is created by the purchaser upon purchasing the electronic device 200, is connected with the network for the first time, the content is output though the electronic device 200, it may be possible to send a message that the purchaser wants to send to the recipient, to customize the electronic device 200, and to provide a new experience to the recipient.

Figure 3:
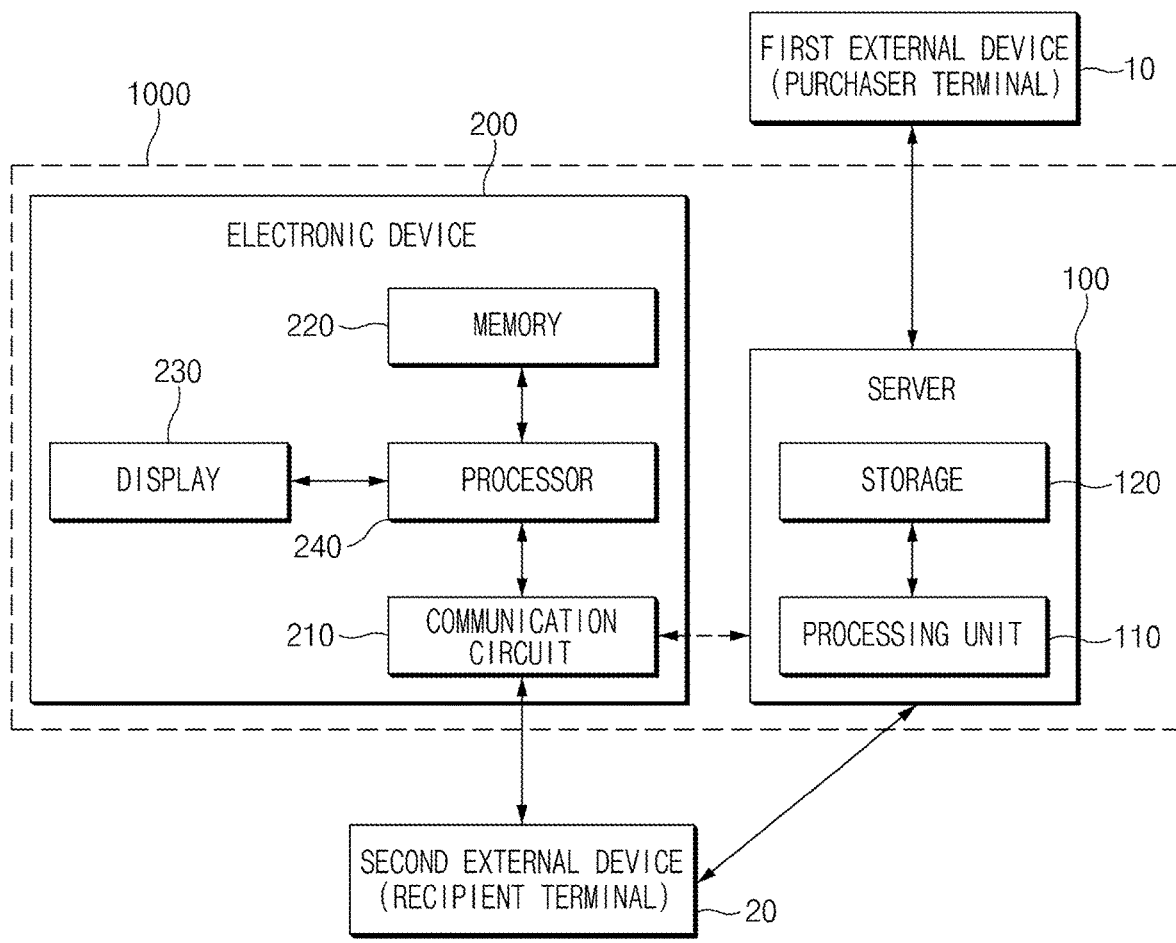
FIG. 3 is a block diagram illustrating configurations of an electronic device and a server according to an embodiment of the present disclosure.

FIG. 3 is a block diagram illustrating configurations of an electronic device and a server according to an embodiment of the present disclosure.

Referring to FIG. 3, a system 1000 for providing content may include the server 100 and the electronic device 200. The server 100 may be connected with the first external device 10 and the electronic device 200, and the electronic device 200 may be connected with the server 100 and/or the second external device 20.

The server 100 according to an embodiment may store content which is created at the first external device 10 and may provide the stored content to the electronic device 200. The server 100 may include a processing unit 110 and storage 120. The server 100 is illustrated in FIG. 3 as being a single device. However, embodiments of the present disclosure are not limited thereto. For example, the server 100 may be implemented with two or more devices.

The processing unit 110 according to an embodiment may receive a request for ordering the electronic device 200 from the first external device 10. The processing unit 110 may provide a web page for the online transaction of the electronic device 200 to the first external device 10. The purchaser may transmit the order request to the server 100 using the first external device 10.

If the order request of the electronic device 200 is received, the processing unit 110 may provide the first external device 10 with a web page for obtaining the content, which corresponds to the order-requested electronic device 200. The processing unit 110 may obtain the content through the web page, which is provided from the first external device 10. The processing unit 110 may obtain an output condition of the content through the web page, which is provided from the first external device 10. The output condition, for example, may include a condition such as a first connection to a network, booting, a specified time, or the like.

The processing unit 110 may obtain account information of a user, which is used upon the online transaction, from the first external device 10.

The processing unit 110 may store the content, which is obtained through the web page and corresponds to the electronic device 200, in the storage 120. The processing unit 110 may store the output condition of the content obtained through the web page in the storage 120, in addition to the content. The processing unit 110 may store the account information of the user in the storage 120, in addition to the content and the output condition.

The processing unit 110 may obtain identification information of the order-requested electronic device 200. The processing unit 110 may obtain the identification information corresponding to the electronic device 200 from a database where a plurality of identification information, which respectively corresponds to a plurality of electronic devices 200, are stored. For example, the processing unit 110 may obtain the identification information corresponding to the electronic device 200 from the database stored in the server 100 or a database stored in an external server. For another example, the processing unit 110 may receive the identification information, which is obtained from the database stored in the external server by the first external device 10, from the first external device 10. For another example, the processing unit 110 may obtain the identification information based on the account information associated with the order request. The identification information may be, for example, an S/N assigned to the electronic device 200 upon manufacturing the electronic device 200.

The processing unit 110 may store the identification information of the order-requested electronic device 200 and the content corresponding to the electronic device 200 in the storage 120. The processing unit 110 may store the content, the output condition, and the identification information in the storage 120 after the content, the output condition, and the identification information are matched.

The processing unit 110 may search for the content, which is stored in the storage 120 and corresponds to the electronic device 200. In response to a request for transmitting the content, which is transmitted by the electronic device 200. For example, the processing unit 110 may search for the content corresponding to the electronic device 200 based on the identification information transmitted by the electronic device 200.

The processing unit 110 may transmit the content found based on the identification information to the electronic device 200. For example, if the processing unit 110 receives the transmission request from the electronic device 200, and the output condition is satisfied, the content corresponding to the electronic device 200 may be transmitted to the electronic device 200.

The electronic device 200 according to an embodiment may be connected with the server 100 through the network. The electronic device 200, for example, may be directly connected with the network using a Wi-Fi module or a cellular module, which is included in a communication circuit 210 and may be connected with the network through the second external device 20 using a Bluetooth module, which is included in the communication circuit 210. The electronic device 200 may include the communication circuit 210, a memory 220, a display 230, and a processor 240.

The communication circuit 210 according to an embodiment may communicate with the server 100 through the network. The communication circuit 210, for example, may include a Bluetooth module, a Wi-Fi module, and/or a cellular module. The communication circuit 210 may transmit data to the server 100 and may receive data from the server 100. In the case where the communication circuit 210 is the Bluetooth module, the communication circuit 210 may communicate with the server 100 through the second external device 20.

The memory 220 according to an embodiment may include a volatile memory and/or non-volatile memory. The memory 220 may store the content obtained from the server 100 and the output condition, in addition to the content. The memory 220 may store the identification information of the electronic device 200. The memory 220 may store, for example, a log, which is a connection history associated with a network of the electronic device 200. For another example, the memory 220 may store information (e.g., flag), which indicates whether the network is connected for the first time or not. The above-described log and flag may be stored in a safety area of the memory 220, which is protected even though the electronic device 200 is initialized.

The display 230 according to an embodiment may output the content obtained from the server 100. For example, the display 230 may output a text, an image, a video, and/or the like, which is included in the content. The electronic device 200 including the display 230 is illustrated in FIG. 3. However, embodiments of the present disclosure are not limited thereto. For example, the electronic device 220 may include different types of output devices such as a speaker instead of the display 230 and may include both the display 230 and the different types of output devices. The display 230 and the different types of output devices may output the content.

The processor 240 according to an embodiment may be electrically connected with the communication circuit 210, the memory 220, and the display 230. The processor 240 may control the communication circuit 210, the memory 220, and the display 230.

The processor 240 may transmit the transmission request of the content corresponding to the electronic device 200 to the server 100. For example, if the electronic device 200 is booted up for the first time, the processor 240 may transmit a request for transmitting the identification information of the electronic device 200 and the content corresponding to the identification information using the communication circuit 210 to the server 100. For another example, if the electronic device 200 is connected to the network for the first time, the processor 240 may transmit the identification information and the transmission request. The processor 240 may determine whether the electronic device 200 is connected with the network for the first time or not.

According to an embodiment, in the case where the processor 240 determines whether the electronic device 200 is connected with the network for the first time or not based on the flag stored in the memory 220, and the electronic device 200 is connected with the network for the first time, the processor 240 may change the flag. For example, the flag may be stored in the memory 220 upon manufacturing the electronic device 200. In the case where the electronic device 200 is connected with the network for the first time, the flag which is stored upon manufacturing the electronic device 200 may have an initial value. If the electronic device 200 is connected to the network, the processor 240 may verify the flag, and in the case where the flag has the initial value, it is determined that the electronic device is connected to the network for the first time. If the processor 240 determines that the electronic device 200 is connected with the network for the first time, the processor 240 may change the flag. If the electronic device 200 is connected with the network later, the processor 240 may verify the changed flag, and therefore the processor 240 may confirm that the electronic device 200 is not connected with the network for the first time.

According to an embodiment, the processor 240 may determine whether the electronic device 200 is connected with the network for the first time or not based on the log, which is stored in the memory 220. Whenever the electronic device 200 is connected with the network, the processor 240 may record a connection history in the log. The processor 240 may determine whether the electronic device 200 is connected with the network for the first time or not by verifying the connection history recorded in the log.

If the output condition is satisfied, the processor 240 may output the content corresponding to the electronic device 200, as a welcoming message on the display 230 (or the different types of output devices, e.g., a speaker) of the electronic device 200.

According to an embodiment, the processor 240 may receive the content corresponding to the identification information using the communication circuit 210 from the server 100. For example, if the server 100 determines that the output condition is satisfied and sends the content corresponding to the identification information, the processor 240 may receive the content. For another example, if the server 100 transmits the content and the output condition to the electronic device 200 after the server 100 searches for the content corresponding to the identification information, the processor 240 may receive the content. If the processor 240 receives the content from the server 100, the content may be stored in the memory 220. The processor 240 may output the content corresponding to the identification information on the display 230. If the content is received, the processor 240 may immediately output the content, and if it is determined that the output condition is satisfied, the processor 240 may output the content. The processor 240 may output the content as a welcoming message.

According to an embodiment, after the content is output, the processor 240 may delete the output content from the memory 220. For example, to output the content once the first booting, the processor 240 may immediately delete the content from the memory 220 after the content is output once.

Hereinafter, flowcharts illustrated in FIGS. 4 to 7 may include operations which the server 100 and the electronic device 200 illustrated in FIGS. 1 to 3. Therefore, although there is omitted content, hereinafter, descriptions of the server 100 and the electronic device 200 described with reference to FIGS. 1 to 3 may be applied to the flowcharts illustrated in FIGS. 4 to 7.

Figure 4:
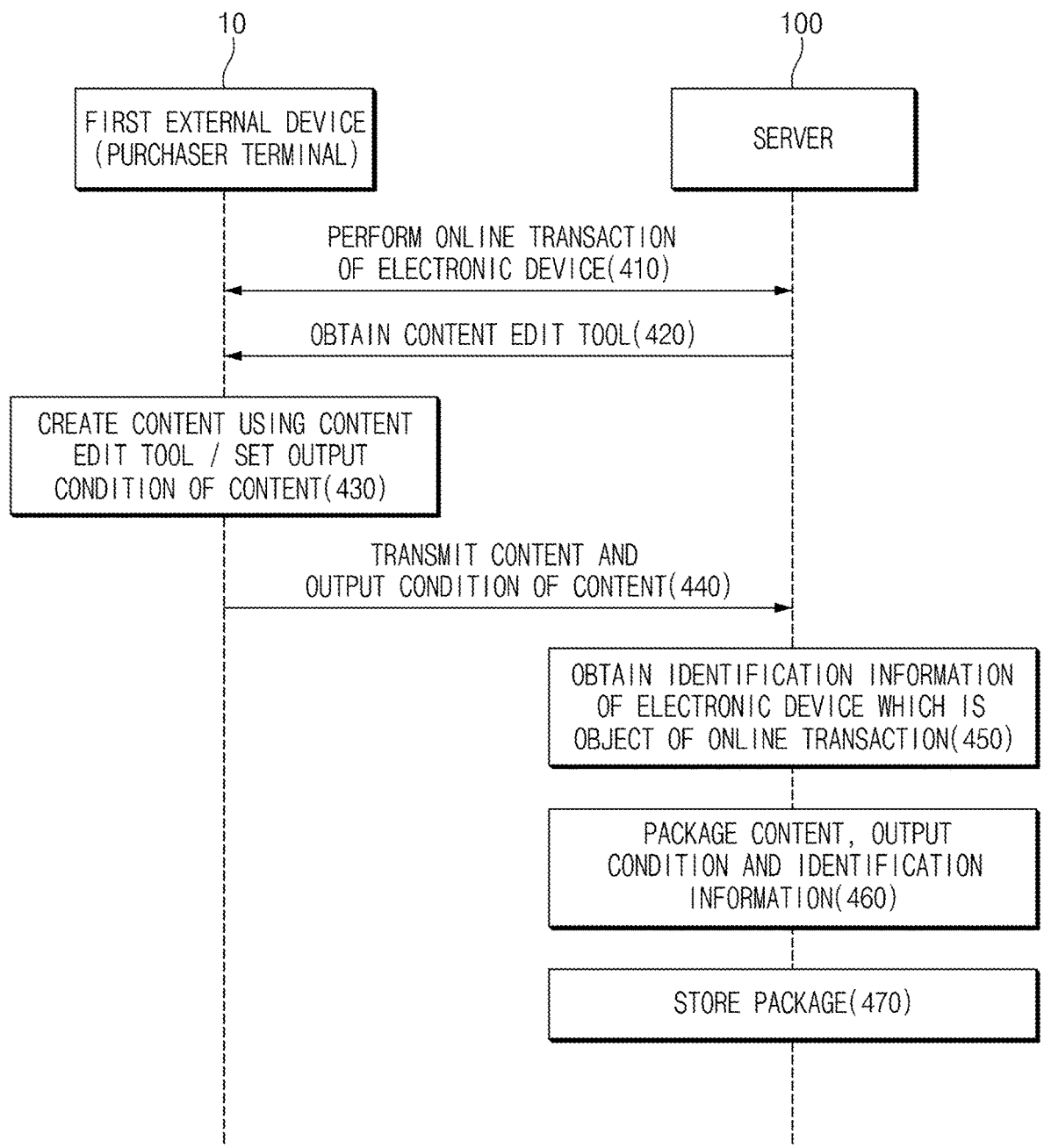
FIG. 4 is a flowchart illustrating a method of providing a welcoming message according to an embodiment of the present disclosure.

FIG. 4 is a flowchart illustrating a method of providing a welcoming message according to an embodiment of the present disclosure.

Referring to FIG. 4, in operation 410, the first external device 10 and the server 100 may perform online transaction of the electronic device 200. For example, the first external device 10 may transmit a request for ordering the electronic device 200 through a web page provided by the server 100. The server 100 may receive the order request of the electronic device 200 from the first external device 10 and may approve the online transaction.

In operation 420, the server 100 may provide a tool for editing content to the first external device 10. For example, the server 100 may provide a web page for obtaining content, which corresponds to the electronic device 200, to the first external device 10. For another example, the server 10 may provide software, which is capable of creating the content, to the first external device 10.

In operation 430, the first external device 10 may create the content using the content editing tool and may set an output condition of the content. For example, the first external device 10 may create the content including a text, an image, a video, and/or the like, which is going to be output at the electronic device 200, on the web page provided by the server 100. The first external device 10 may set the output condition for setting a time when the content is going to be output at the electronic device 200.

In operation 440, the first external device 10 may transmit the content and the output condition of the content. For example, the first external device 10 may transmit the content and the output condition of the content through the web page to the server 100. The first external device 10 may transmit account information of a user, which is associated with the online transaction, in addition to the content.

According to an embodiment, the server 100 may store the content obtained through the web page, the output condition of the content, and identification information of the electronic device 200.

In detail, in operation 450, the server 100 may obtain the identification information of the electronic device 200, which is a target of the online transaction. After the online transaction is performed, the electronic device 200 to be shipped to a recipient may be specified. If the electronic device 200 to be shipped is specified, the server 100 may obtain the identification information (e.g., an S/N) of the electronic device 200 which is bought through the online transaction, after the content is received. For example, the server 100 may obtain data stored in the server 100 or the identification information of the electronic device 200 from another external device. For another example, the server 100 may obtain the identification information, which the first external device 10 obtains from another external device, from the first external device 10.

In operation 460, the server 100 may package the content, the output condition, and the identification information. In the case where the output condition of the content corresponding to the identification information is satisfied, the server 100 may match the content, the output condition, and the identification information for providing the content, the output condition, and the identification information to the electronic device 200. The server 100 may package the identification information corresponding to the electronic device 200, the content corresponding to the electronic device 200, and the output condition corresponding to the content.

In operation 470, the server 100 may store a package including the content, the output condition, and the identification information. If the electronic device 200 requests the content later, the server 100 may provide the content included in the package to the electronic device 200.

Operations 410, 420, 450, 460, and 470 are illustrated in FIG. 4 as being performed in one server. However, embodiments of the present disclosure are not limited thereto. For example, operations 410, 420, 450, 460, and 470 may be performed in two or more servers. For example, operations 410 and 420 may be performed in a first server, and operations 450, 460, and 470 may be performed in a second server.

Figure 5:
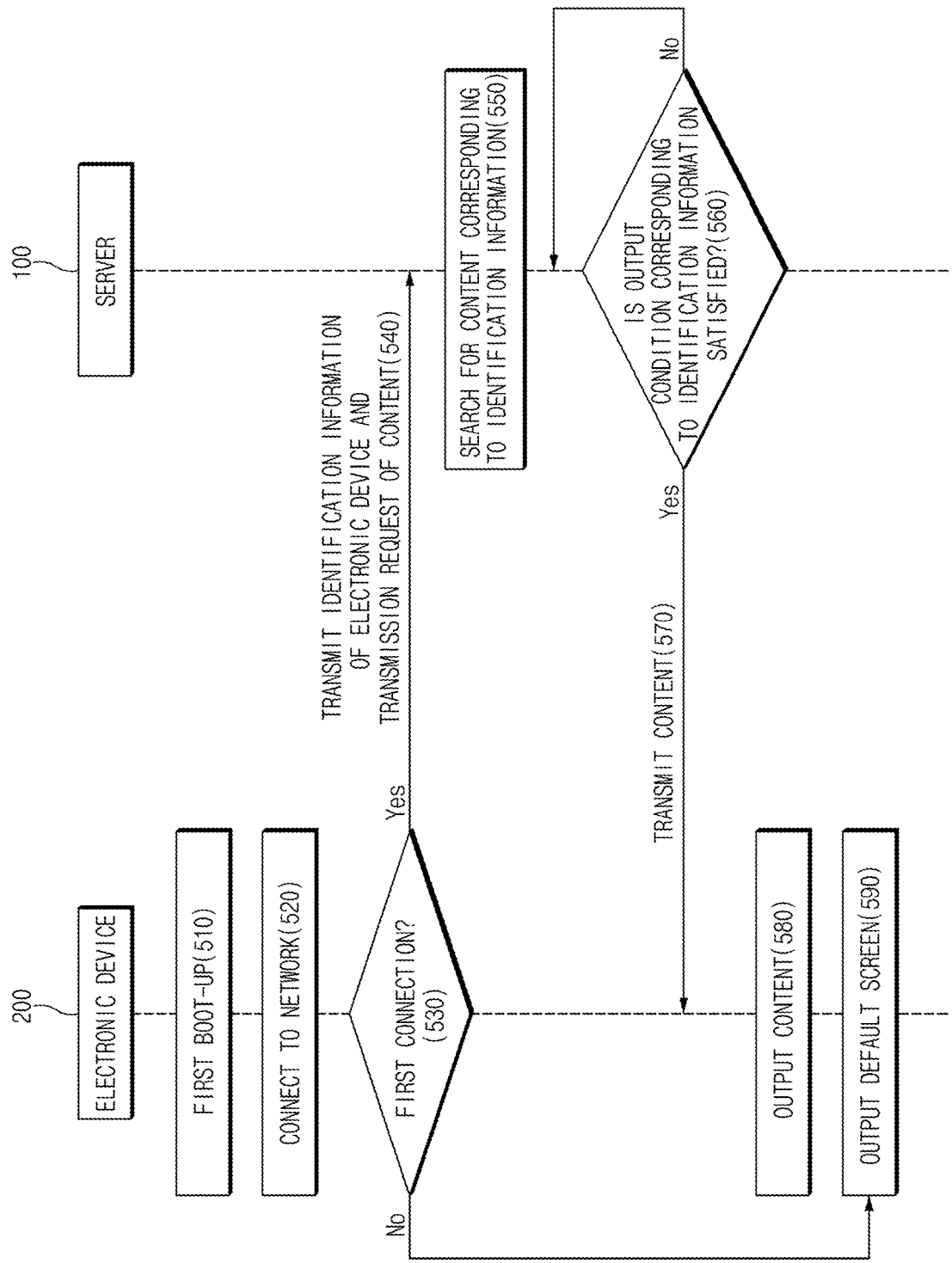
FIG. 5 is a flowchart illustrating a method of providing a welcoming message according to an embodiment of the present disclosure.

FIG. 5 is a flowchart illustrating a method of providing a welcoming message according to an embodiment of the present disclosure.

Referring to FIG. 5, in operation 510, the electronic device 200 may be booted up for the first time. The electronic device 200 may be booted up as a user pushes a power button of the electronic device 200.

In operation 520, the electronic device 200 may be connected with a network. For example, the electronic device 200 may be connected with a Wi-Fi network, a cellular network, or the like.

According to an embodiment, if the electronic device 200 is connected with the network, the electronic device 200 may transmit a request for transmitting identification information and content to the server 100. For example, in the case where the electronic device 200 is connected with the network for the first time, the electronic device 200 may transmit the identification information and the transmission request, to the server 100.

In detail, in operation 530, the electronic device 200 may determine whether a connection of the electronic device 200 to the network in operation 520 is a first connection or not. For example, the electronic device 200 may determine whether the connection of the electronic device 200 to the network is the first connection or not based on a log including a connection history of the network stored in the electronic device 200 or a flag indicating whether the electronic device 200 is connected with the network for the first time or not.

In operation 540, the electronic device 200 may transmit the identification information of the electronic device 200 and the transmission request of the content. For example, the electronic device 200 may transmit the S/N of the electronic device 200, which is stored in the electronic device 200, to the server 100 and may request the content corresponding to the electronic device 200.

In operation 550, the server 100 may search for the content corresponding to the identification information. For example, the server 100 may search for the content corresponding to the electronic device 200, which are created by the first external device 10 based on the identification information received from the electronic device 200.

In operation 560, the server 100 may determine whether an output condition corresponding to the identification information is satisfied. For example, in the case where the output condition is a first connection of the electronic device 200 to the network, if the transmission request is received from the electronic device 200, the server 100 may determine that the output condition is satisfied. For another example, in the case where the output condition is a specified time, the server 100 may determine that the output condition is satisfied if the specified time arrives. In the case where the output condition is not satisfied, the server 100 may check whether the output condition is satisfied or not until the output condition is satisfied.

If the output condition is satisfied, in operation 570, the server 100 may transmit the content to the electronic device 200. For example, the server 100 may transmit the content to the electronic device 200 through the network.

In operation 580, the electronic device 200 may output the content. For example, the electronic device 200 may output a text, an image, a sound source, and/or a video, which is included in the content as a welcoming message through an output device such as a speaker, display, and/or the like.

In operation 590, the electronic device 200 may output a default screen. For example, the electronic device 200 may output a default screen after the received content is output. For another example, in the case where it is determined that the connection in operation 530 is not the first connection, the electronic device 200 may output a default screen.

Figure 6:
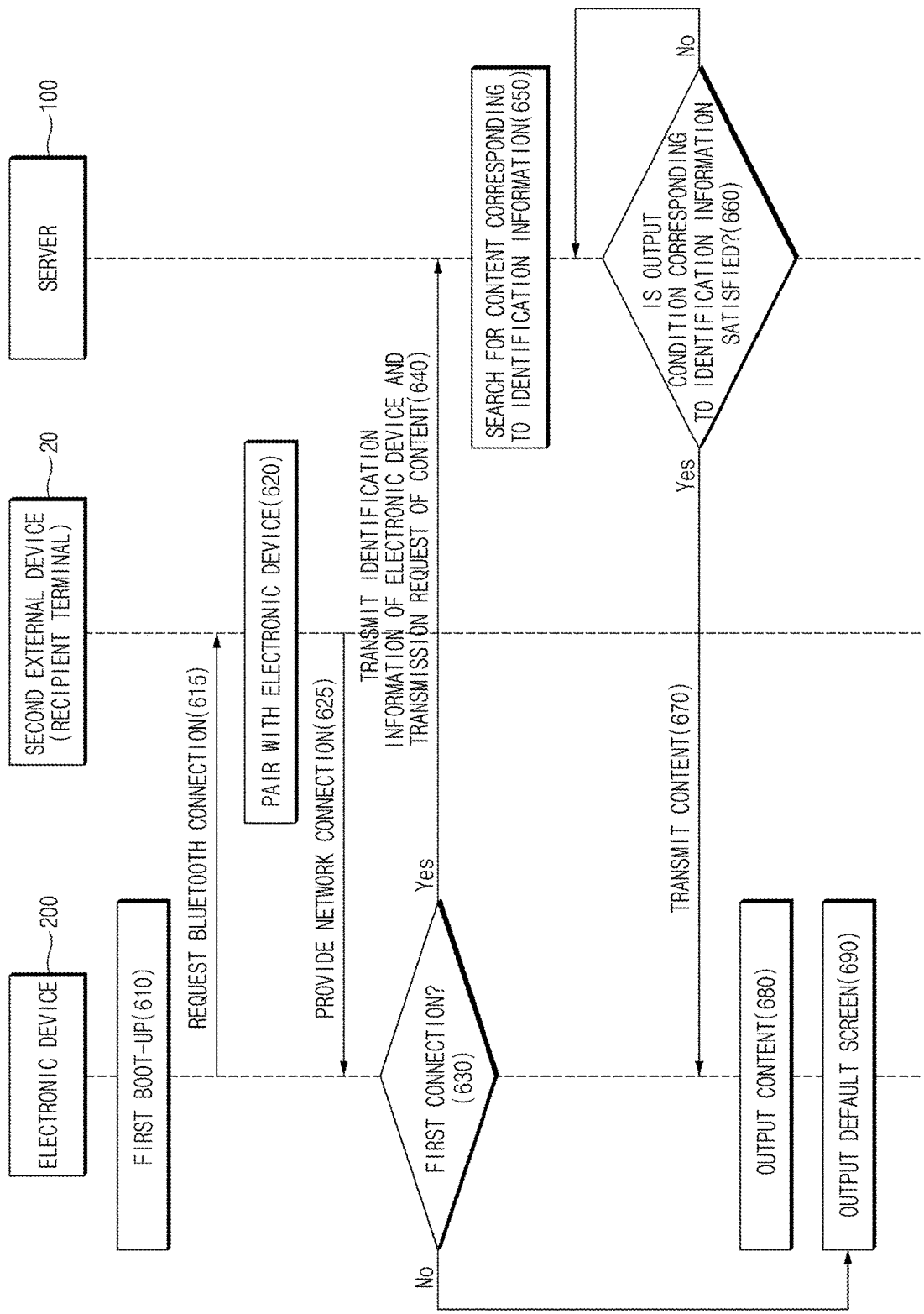
FIG. 6 is a flowchart illustrating a method of providing a welcoming message according to an embodiment of the present disclosure.

FIG. 6 is a flowchart illustrating a method of providing a welcoming message according to an embodiment of the present disclosure.

According to an embodiment, if the electronic device 200 is paired with an external device using a Bluetooth module, and therefore the electronic device 200 is connected with the network for the first time, the electronic device 200 may transmit a request for transmitting content to the server 100 through the external device and may receive the content corresponding to identification information through the external device from the server 100.

In detail, in operation 610, the electronic device 200 may be booted up for the first time.

In operation 615, the electronic device 200 may request a connection in a manner of Bluetooth to the second external device 20. For example, the electronic device 200 may broadcast a signal using a Bluetooth module.

In operation 620, the electronic device 200 may be paired with the second external device 20. For example, the second external device 20 may detect the broadcast signal from the electronic device 200 and may be paired with the electronic device 200 through approving connection of the second external device 20 to the electronic device 200.

In operation 625, the second external device 20 may provide connection of the network to the electronic device 200. For example, if the second external device 20 is paired with the electronic device 200 in a manner of Bluetooth, the second external device 20 may provide connection of the network to the electronic device 200. The electronic device 200 may communicate with the server 100 though the second external device 20.

In operation 630, the electronic device 200 may determine whether connection of the network in operation 625 is first connection or not. In operation 640, the electronic device 200 may transmit the identification information of the electronic device 200 and the transmission request of the content to the server 100 through the second external device 20. In operation 650, the server 100 may search for the content corresponding to the identification information. In operation 660, the server 100 may determine whether an output condition corresponding to the identification information is satisfied or not. If the output condition is satisfied, in operation 670, the server 100 may transmit the content to the electronic device 200 through the second external device 20. In operation 680, the electronic device 200 may output the content. In operation 690, the electronic device 200 may output a default screen. Operations 630 to 690 may be similar to operations 530 to 590, respectively.

Figure 7:
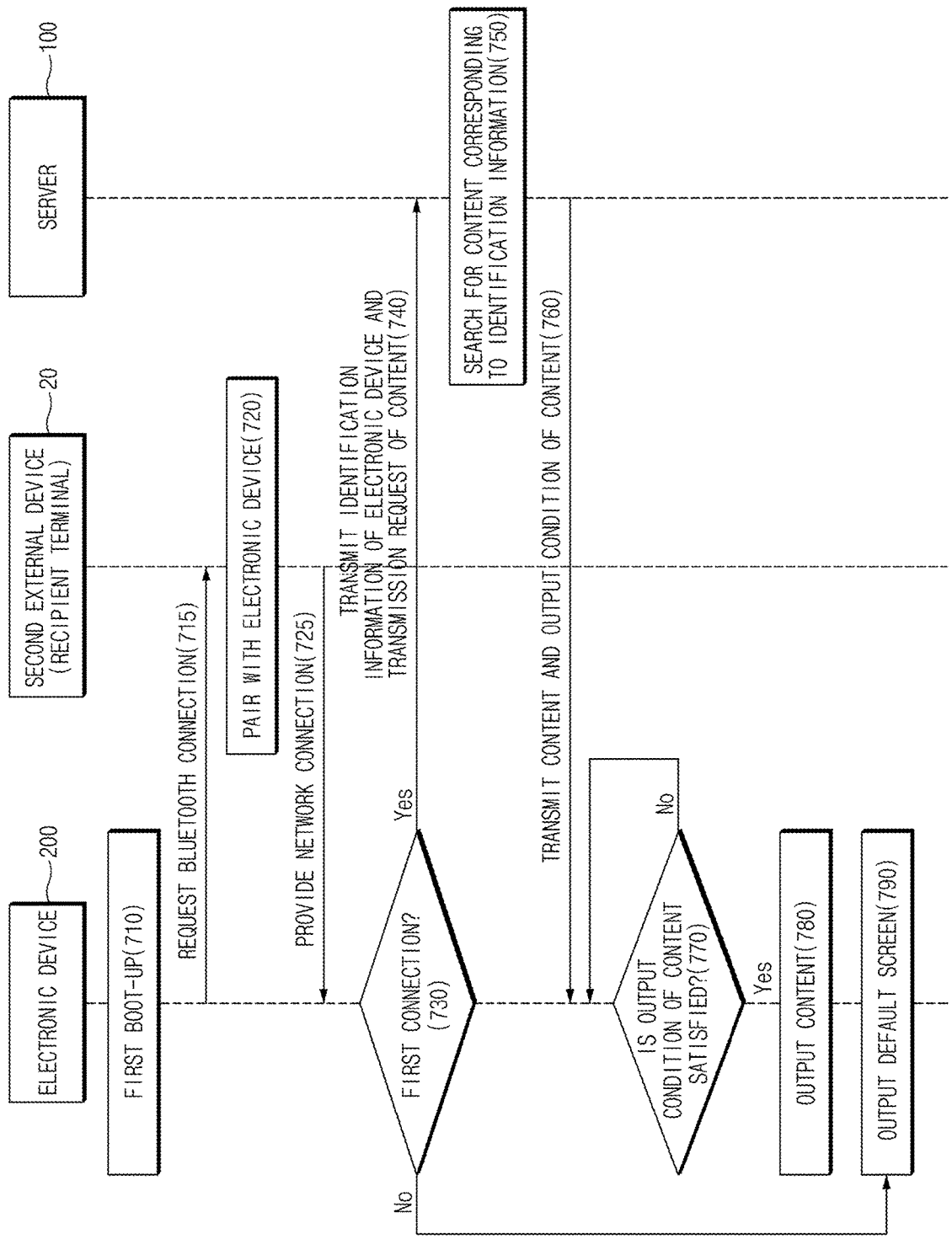
FIG. 7 is a flowchart illustrating a method of providing a welcoming message according to an embodiment of the present disclosure.

FIG. 7 is a flowchart illustrating a method of providing a welcoming message according to an embodiment of the present disclosure.

Referring to FIG. 7, in operation 710, the electronic device 200 may be booted up for the first time. In operation 715, the electronic device 200 may request a connection in a manner of Bluetooth from the second external device 20. In operation 720, the electronic device 200 may be paired with the second external device 20. In operation 725, the second external device 20 may provide a connection of the network to the electronic device 200. In operation 730, the electronic device 200 may determine whether the connection of the network to the electronic device 200 in operation 725 is a first connection or not. In operation 740, the electronic device 200 may transmit identification information of the electronic device 200 and a request for transmitting content. In operation 750, the server 100 may search for the content corresponding to the identification information. Operations 710 to 750 may be similar to operations 610 to 650, respectively.

In operation 760, the server 100 may transmit the content corresponding to the electronic device 200 and an output condition of the content to the electronic device 200. For example, the server 100 may transmit the content matched with the identification information and the output condition matched with the identification information to the electronic device 200 through the first external device 10 in response to the transmission request. The electronic device 200 may store the received content and the output condition.

In operation 770, the electronic device 200 may determine the output condition of the content is satisfied or not. For example, in the case where the received output condition is a first connection of the electronic device 200 to the network, if the content is received from the server 100, the electronic device 200 may determine that the output condition is satisfied. For another example, in the case where the received output condition is a specified time, if the specified time arrives, the electronic device 200 may determine that the output condition is satisfied. In the case where the output condition is not satisfied, the electronic device 200 may check whether the output condition is satisfied or not until the output condition is satisfied.

If the output condition is satisfied, in operation 780, the electronic device 200 may output the content. In operation 790, the electronic device 200 may output a default screen. Operations 780 and 790 may be similar to operations 680 and 690, respectively.

Figure 8:
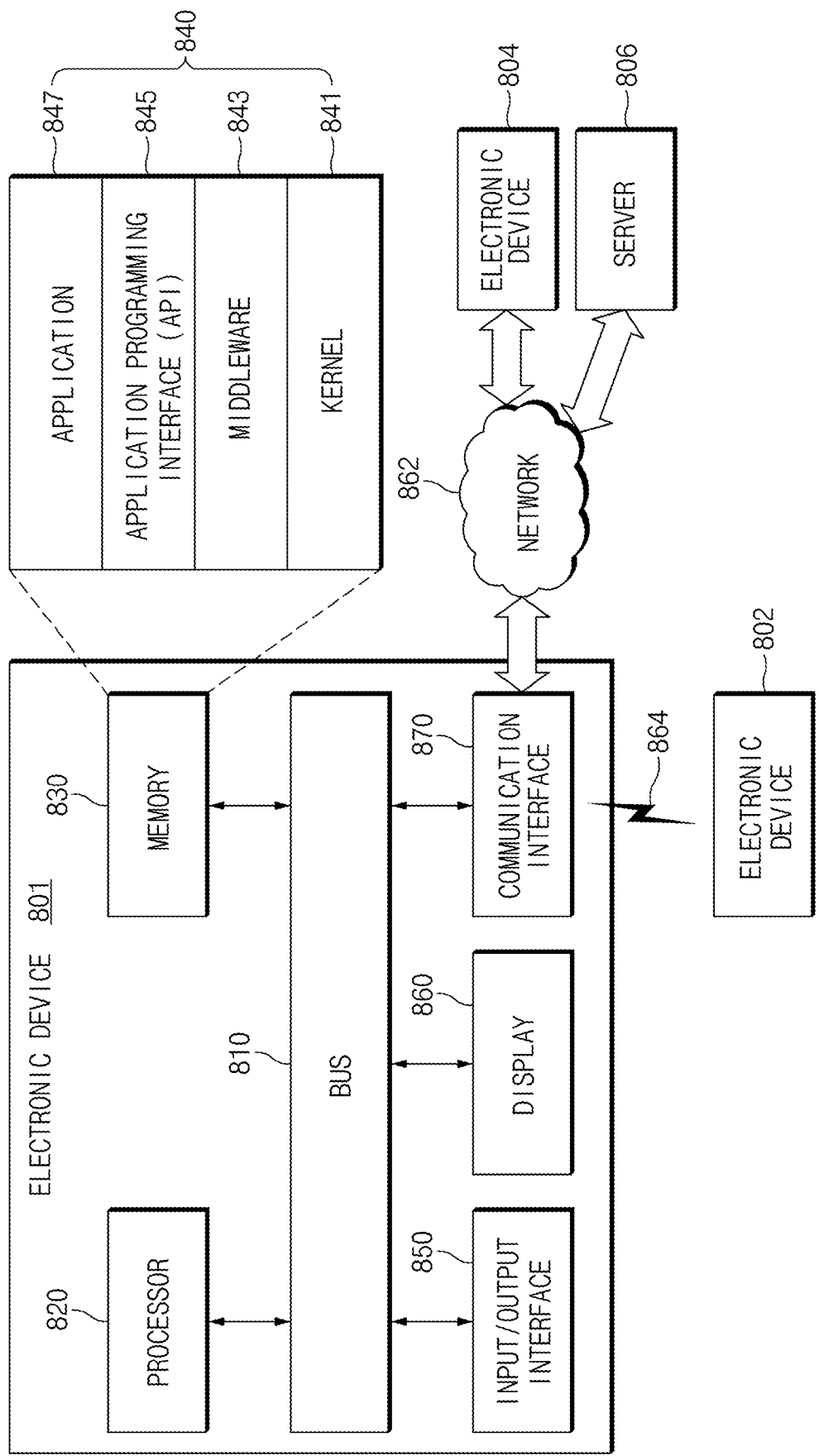
FIG. 8 illustrates an electronic device in a network environment according to an embodiment of the present disclosure.

FIG. 8 illustrates an electronic device in a network environment according to an embodiment of the present disclosure.

Referring to FIG. 8, electronic devices 801, 802, and 804 or a server 806 may be connected to one another through a network 862 or a local area network 864. The electronic device 801 may include a bus 810, a processor 820, a memory 830, an input/output (I/O) interface 850, a display 860, and a communication interface 870. In some embodiments, the electronic device 801 may exclude any one of the components, or may further include other components.

The bus 810 may include, for example, a circuit, which connects the components 810 to 870 to each other and transfers the communication (e.g., a control message and/or data) between the components 810 to 870.

The processor 820 may include one or more of a CPU, an AP or a communication processor (CP). The processor 820 may execute, for example, a control and/or communication-related operation or data processing for at least one other component of the electronic device 801.

The memory 830 may include a volatile and/or non-volatile memory. The memory 830 may store, for example, a command or data related to at least one other component of the electronic device 801. In one embodiment, the memory 830 may store software and/or a program 840. The program 840 may include, for example, a kernel 841, a middleware 843, an application programming interface (API) 845, and/or an application program (or "application")

847. At least some of the kernel 841, the middleware 843 or the API 845 may be referred to as an operating system (OS).

The kernel 841 may, for example, control or manage the system resources (e.g., the bus 810, the processor 820, the memory 830, or the like) that are used to execute the operation or function implemented in other programs (e.g., the middleware 843, the API 845, or the application program 47). Further, the kernel 841 may provide an interface by which the middleware 843, the API 845 or the application program 847 can control or manage the system resources by accessing the individual components of the electronic device 801.

The middleware 843 may, for example, perform an intermediary role so that the API 845 or the application program 847 may exchange data with the kernel 841 by communicating with the kernel 841.

In addition, the middleware 843 may process one or more task requests received from the application program 847 according to priorities thereof. For example, For example, the middleware 843 may assign priorities for using the system resources (e.g., the bus 810, the processor 820, the memory 830, or the like) of the electronic device 801 among at least one of the application programs 847. For example, the middleware 843 may perform scheduling or loading balancing on the one or more task requests by processing the one or more task requests according to the priorities assigned thereto.

The API 845 is, for example, an interface by which the application 847 controls the function provided in the kernel 841 or the middleware 843, and may include at least one interface or function (e.g., a command) for, for example, file control, window control, image processing or character control, or the like.

The I/O interface 850 may, for example, serve as an interface that can transfer a command or data received from the user or other external device to the other components of the electronic device 801. Further, the I/O interface 850 may output a command or data received from the other components of the electronic device 801, to the user or other external devices.

The display 860 may include, for example, a liquid crystal display (LCD) display, a light emitting diode (LED) display, an organic LED (OLED) display, a micro-electromechanical systems (MEMS) display, or an electronic paper display. The display 860 may, for example, display a variety of content (e.g., texts, images, videos, icons, symbols or the like), for the user. The display 860 may include a touch screen, and may receive a touch input, a gesture input, a proximity input or a hovering input made by, for example, an electronic pen or a part of the user's body.

The communication module 870 may, for example, establish communication between the electronic device 801 and an external device (e.g., a first external electronic device 802, a second external electronic device 804 or a server 806). For example, the communication module 870 may communicate with the external device (e.g., the second external electronic device 804 or the server 806) by being connected to a network 862 by wireless communication or wired communication.

The wireless communication may include at least one of, for example, long term evolution (LTE), LTE-advanced (LTE-A), code division multiple access (CDMA), wideband CDMA (WCDMA), universal mobile telecommunication system (UMTS), wireless broadband (WiBro) or global system for mobile communication (GSM), as a cellular communication protocol. Further, the wireless communication may include, for example, short-range communication 864. The short-range communication 864 may include at least one of, for example, Wi-Fi, Bluetooth, near field communication (NFC), magnetic stripe transmission (MST), or GNSS.

MST may generate a pulse according to the transmission data using an electromagnetic signal, and the pulse may generate a magnetic field signal. The electronic device 801 may transmit the magnetic field signal to POS, the POS may detect the magnetic field signal using a MST reader, and the data is restored by converting the detected magnetic field signal to an electric signal.

GNSS may include at least one of, for example, global positioning system (GPS), global navigation satellite system (GLONASS), Beidou navigation satellite system (Beidou) or Galileo, and the European global satellite-based navigation system, depending on the area of use or the bandwidth. In the present disclosure, the term "GPS" may be interchangeably used with the term "GNSS". The wired communication may include at least one of, for example, universal serial bus (USB), high definition multimedia interface (HDMI), recommended standard 232 (RS-232) or plain old telephone service (POTS). The network 862 may include a telecommunications network, for example, at least one of the computer network (e.g., a local area network (LAN) or a wide area network (WAN)), the Internet or the telephone network.

Each of the first and second external electronic devices 802 and 804 may be a device that is the same as or different from the electronic device 801. In an embodiment, the server 806 may include a group of one or more servers. In various embodiments, all or some of the operations executed in the electronic device 801 may be executed in one or multiple other electronic devices (e.g., the external electronic devices 802, 804 or the server 806). In an embodiment, in the case that the electronic device 801 should perform a certain function or service automatically or upon request, the electronic device 801 may request at least some of the functions related thereto from other electronic devices (e.g., the electronic devices 802, 804, or the server 806), instead of or in addition to executing the function or service. The other electronic devices (e.g., the electronic devices 802, 804, or the server 806) may execute the requested function or additional function, and deliver the results to the electronic device 801. The electronic device 801 may process the received results intact or additionally, thereby providing the requested function or service. To this end, for example, the cloud computing, distributed computing, or client-server computing technology may be used.

Figure 9:
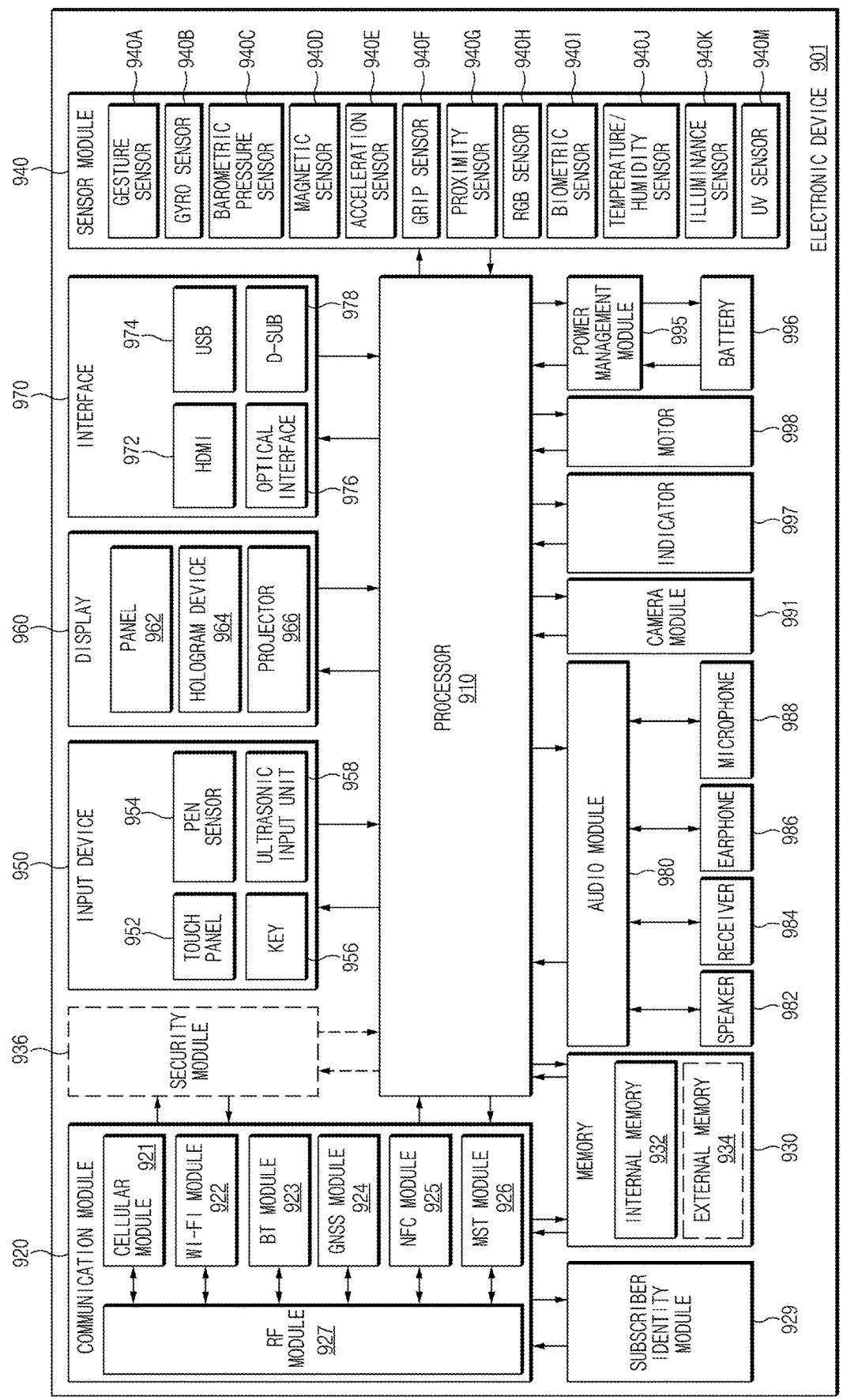
FIG. 9 is a block diagram of an electronic device according to an embodiment of the present disclosure.

FIG. 9 is a block diagram of an electronic device according to an embodiment of the present disclosure.

Referring FIG. 9, an electronic device 901, for example, may include the whole or a part of the electronic device 801 illustrated in FIG. 8. The electronic device 901 includes one or more processors (e.g., AP) 910, a communication module 920, a subscriber identity module 929, a memory 930, a sensor module 940, an input device 950, a display 960, an interface 970, an audio module 980, a camera module 991, a power management module 995, a battery 996, an indicator 997, and a motor 998.

The processor 910 may control a plurality of hardware or software components connected to the processor by running, for example, the OS or an application program, and may process and calculate various data. The processor 910 may be implemented as, for example, a system on chip (SoC). According to an embodiment, the processor 910 may further include a graphic processing unit (GPU) and/or an image signal processor (ISP). The processor 910 may include at least some (e.g., a cellular module 921) of the components shown in FIG. 9. The processor 910 may load, on a volatile memory, a command or data received from at least one of other components (e.g., non-volatile memory) and process the loaded command or data, and may store a variety of data in a non-volatile memory.

The communication module 920 may have a structure which is the same as or similar to that of the communication module 870 in FIG. 8. The communication module 920 may include, for example, the cellular module 921, a Wi-Fi module 922, a Bluetooth module 923, a GNSS module 924 (e.g., a GPS module, a GLONASS module, or Galileo module), an NFC module 925, a MST module 926, and a radio frequency (RF) module 927.

The cellular module 921 may provide, for example, a voice call service, a video call service, a messaging service or an Internet service over a communication network. In an embodiment of the present disclosure, the cellular module 921 may identify and authenticate the electronic device 901 within the communication network using the subscriber identity module (e.g., the SIM card 929). According to an embodiment, the cellular module 921 may have some of the functions that can be provided by the processor 910. In an embodiment of the present disclosure, the cellular module 921 may include a CP.

Each of the Wi-Fi module 922, the Bluetooth module 923, the GNSS module 924, the NFC module 925, or the MST module 926 may include, for example, a processor for processing the data transmitted or received through the corresponding module. According to some embodiments, at least some (e.g., two or more) of the cellular module 921, the Wi-Fi module 922, the Bluetooth module 923, the GNSS module 924, the NFC module 925, or the MST module 926 may be included in one integrated chip (IC) or IC package.

The RF module 927 may transmit and receive, for example, communication signals (e.g., RF signals). The RF module 927 may include, for example, a transceiver, a power amplifier module (PAM), a frequency filter, a low noise amplifier (LNA), or an antenna. In another embodiment of the present disclosure, at least one of the cellular module 921, the Wi-Fi module 922, the Bluetooth module 923, the GNSS module 924, the NFC module 925, or the MST module 926 may transmit and receive RF signals through a separate RF module.

The subscriber identity module 924 may include, for example, a card with the subscriber identity module and/or an embedded SIM. The subscriber identity module 924 may include unique the identification information (e.g., integrated circuit card identifier (ICCID)) or subscriber information (e.g., international mobile subscriber identity (IMSI)).

The memory 930 (e.g., the memory 830) may include, for example, an internal memory 932 or an external memory 934. The internal memory 932 may include at least one of, for example, a volatile memory (e.g., dynamic random access memory (DRAM), static RAM (SRAM), synchronous dynamic RAM (SDRAM) or the like) or a non-volatile memory (e.g., one time programmable read only memory (OTPROM), programmable ROM (PROM), erasable and programmable ROM (EPROM), electrically erasable and programmable ROM (EEPROM), mask ROM, flash ROM, flash memory (e.g., a NAND flash, a NOR flash or the like)), hard drive, or solid state drive (SSD)).

The external memory 934 may further include a flash drive, for example, compact flash (CF), secure digital (SD), micro-SD, mini-SD, extreme digital (xD), multi-media card (MMC), a memory stick, or the like. The external memory 934 may be functionally and/or physically connected to the electronic device 901 through various interfaces.

The security module 936 may be a module which has a relatively higher secure level than the memory 930 and may be a circuit which stores secure data and guarantees a protected execution environment. The security module 936 may be implemented with a separate circuit and may include a separate processor. The security module 936 may include, for example, an embedded secure element (eSE) which is present in a removable smart chip or a SD card or is embedded in a fixed chip of the electronic device 901. Also, the security module 936 may be driven by an OS different from the OS of the electronic device 901. For example, the security module 936 may operate based on a java card open platform (JCOP) OS.

The sensor module 940 may, for example, measure the physical quantity or detect the operating status of the electronic device 901, and convert the measured or detected information into an electrical signal. The sensor module 940 may include at least one of, for example, a gesture sensor 940A, a gyro sensor 940B, a barometer pressure sensor 940C, a magnetic sensor 940D, an acceleration sensor 940E, a grip sensor 940F, a proximity sensor 940G, a color sensor (e.g., red, green, blue (RGB) sensor) 940H, a biosensor 9401, a temperature/humidity sensor 940J, an illuminance sensor 940K, or a ultra violet (UV) sensor 940M. Additionally or alternatively, the sensor module 940 may include, for example, an E-nose sensor, an electromyography (EMG) sensor, an electroencephalogram (EEG) sensor, an electrocardiogram (ECG) sensor, an infrared (IR) sensor, an iris sensor and/or a fingerprint sensor. The sensor module 940 may further include a control circuit for controlling at least one or more sensors belonging thereto. In some embodiments, the electronic device 901 may further include a processor configured to control the sensor module 940, independently of or as a part of the processor 910, and may control the sensor module 940 while the processor 910 is in a sleep state.

The input device 950 may include, for example, a touch panel 952, a (digital) pen sensor 954, a key 956, or an ultrasonic input unit 958. The touch panel 952 may use at least one of, for example, capacitive, resistive, IR or ultrasonic scheme. The touch panel 952 may further include a control circuit. The touch panel 952 may further include a tactile layer, to provide a tactile or haptic feedback to the user.

The (digital) pen sensor 954, for example, may be a part of the touch panel 952, or may include a separate recognition sheet. The key 956 may include, for example, a physical button, an optical key or a keypad. The ultrasonic input unit 958 may detect an ultrasonic signal generated in an input tool through a microphone (e.g., a microphone 988) and check data corresponding to the detected ultrasonic signal.

The display 960 (e.g., the display 860) may include a panel 962, a hologram device 964, or a projector 966. The panel 962 may include a structure which is the same as or similar to that of the display 860 in FIG. 8. The panel 962 may be implemented to be, for example, flexible, transparent or wearable. The panel 962, together with the touch panel 952, may be implemented as one module. The hologram device 964 may show stereoscopic images in the air using the interference of the light. The projector 966 may display images by projecting the light on the screen. The screen may be disposed on the inside or outside of, for example, the electronic device 901. According to an embodiment, the display 960 may further include a control circuit for controlling the panel 962, the hologram device 964, or the projector 966.

The interface 970 may include, for example, an HDMI 972, a USB 974, an optical interface 976 or D-subminiature (D-sub) 978. The interface 970 may be included in, for example, the communication module 870 shown in FIG. 8. Additionally or alternatively, the interface 970 may include, for example, a mobile high-definition link (MHL) interface, an SD card/MMC interface or an infrared data association (IrDA) interface.

The audio module 980, for example, may convert the sound and electrical signals bi-directionally. At least some components of the audio module 980 may be included in, for example, the I/O interface 850 shown in FIG. 8. The audio module 980 may process the sound information that is received or output through, for example, a speaker 982, a receiver 984, an earphone 986 or the microphone 988.

The camera module 991 is, for example, a device capable of capturing still images and videos. According to an embodiment, the camera module 991 may include one or more image sensors (e.g., a front image sensor or a rear image sensor), a lens, an ISP, or a flash (e.g., an LED or xenon lamp).

The power management module 995 may, for example, manage the power of the electronic device 901. In an embodiment of the present disclosure, the power management module 995 may include, for example, a power management integrated circuit (PMIC), a charger integrated circuit (IC), or a battery or fuel gauge. The PMIC may have a wired and/or wireless charging scheme. The wireless charging scheme may include, for example, a magnetic resonance scheme, a magnetic induction scheme, or an electromagnetic scheme, and the power management module 995 may further include additional circuits, such as a coil loop, a resonant circuit, a rectifier or the like, for wireless charging. The battery or fuel gauge may, for example, measure the remaining capacity, charging voltage, charging current or temperature of the battery 996. The battery 996 may include, for example, a rechargeable battery and/or a solar battery.

The indicator 997 may indicate specific status (e.g., boot status, message status, charging status or the like) of the electronic device 901 or a part (e.g., the processor 910) thereof. The motor 998 may convert an electrical signal into mechanical vibrations, thereby generating a vibration or haptic effect. Although not shown, the electronic device 901 may include a processing device (e.g., GPU) for mobile TV support. The processing device for mobile TV support may process media data that is based on the standards such as, digital multimedia broadcasting (DMB), digital video broadcasting (DVB) or mediaFLO™.

Each of above-described elements may be configured with one or more components, names of which may vary depending on the type of the electronic device. In various embodiments, the electronic device may include at least one of the above-described components, some of which may be omitted, or may further include additional other components. Further, some of the components of the electronic device according to various embodiments of the present disclosure may be configured as one entity by being combined, thereby performing the previous functions of the components in the same manner.

Figure 10:
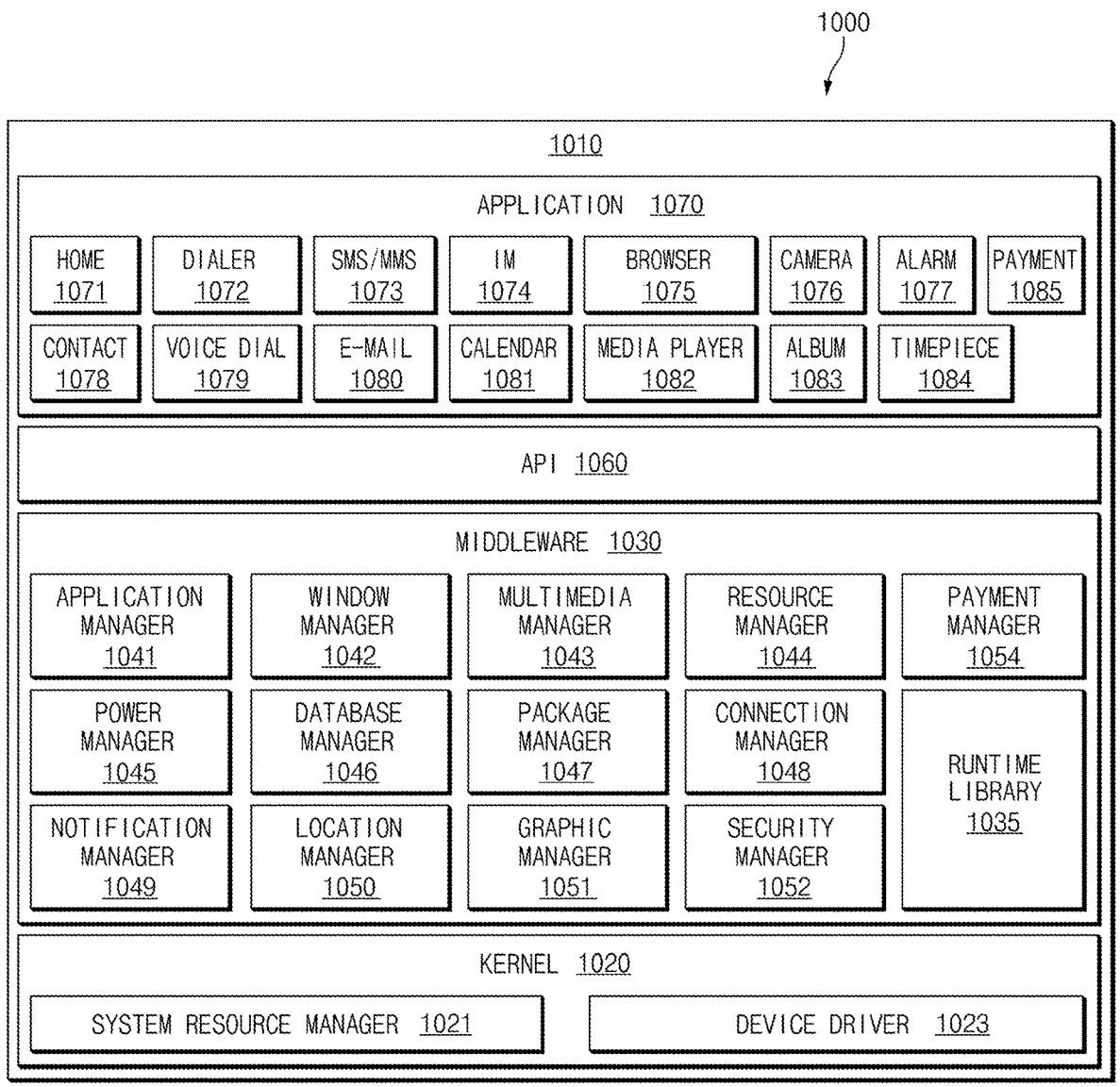
FIG. 10 is a block diagram of a program module according to an embodiment of the present disclosure.

FIG. 10 is a block diagram of a program module according to an embodiment of the present disclosure.

Referring to FIG. 10, the program module 1010 (e.g., the program 810) may include an OS for controlling resources related to the electronic device (e.g., the electronic device 801) and/or various applications (e.g., the application program 847) executed in the OS. The OS may be, for example, Android®, iOS®, Windows®, Symbian™, Tizen®, Bada™, or the like.

The program module 1010 may include a kernel 1020, middleware 1030, an API 1060, and/or an application 1070. At least some of the program module 1010 may be preloaded on the electronic device, or may be downloaded from an external electronic device (e.g., electronic devices 802 and 804, or the server 806).

The kernel 1020 (e.g., the kernel 841) may include, for example, a system resource manager 1021 and/or a device driver 1023. The system resource manager 1021 may perform the control, allocation, retrieval, or the like of system resources. According to an embodiment, the system resource manager 1021 may include a process manager, a memory manager, a file system manager, or the like. The device driver 1023 may include, for example, a display driver, a camera driver, a Bluetooth driver, a shared memory driver, a USB driver, a keypad driver, a Wi-Fi driver, an audio driver, or an inter-process communication (IPC) driver.

The middleware 10100 may, for example, provide a function required by the application 1070 in common or provide various functions to the application 1070 through the API 1060, and therefore the application 1070 may efficiently use limited system resources within the electronic device. According to an embodiment, the middleware 1030 (e.g., the middleware 843) may include at least one of a runtime library 1035, an application manager 1041, a window manager 1042, a multimedia manager 1043, a resource manager 1044, a power manager 1045, a database manager 1046, a package manager 1047, a connection manager 1048, a notification manager 1049, a location manager 1050, a graphic manager 1051, a security manager 1052, and a payment manager 1054.

The runtime library 1035 may, for example, include a library module which a compiler uses to add a new function through a programming language while the application 1070 is being executed. The runtime library 1035 may perform I/O management, memory management, the functionality for an arithmetic function, or the like.

The application manager 1041 may manage, for example, a life cycle of at least one application of the application 1070. The window manager 1042 may manage graphical user interface (GUI) resources used for a screen. The multimedia manager 1043 may determine a format required to reproduce various media files, and may encode or decode a media file using a coder/decoder (codec) appropriate for the corresponding format. The resource manager 1044 may manage resources, such as source code, memory, storage space, and the like of at least one of application of the application 1070.

The power manager 1045 may, for example, operate with a basic input/output system (BIOS) to manage a battery or power, and may provide power information required for the operation of the electronic device. The database manager 1046 may generate, search for, and/or change a database to be used by at least one application of the application 1070. The package manager 1047 may manage the installation or update of an application distributed in the form of a package file.

The connection manager 1048 may manage a wireless connection such as, Wi-Fi or Bluetooth. The notification manager 1049 may display or notify of an event, such as an arrival of a message, an appointment, a proximity notification, and the like, in such a manner as not to disturb a user.

The location manager 1050 may manage location information of the electronic device. The graphic manager 1051 may manage a graphic effect, which is to be provided to a user, or a user interface related to a graphic effect. The security manager 1052 may provide various security functions required for system security, user authentication, and the like. According to an embodiment, if the electronic device (e.g., the electronic device 801) has a telephone call function, the middleware 1030 may further include a telephony manager for managing a voice call function or a video call function of the electronic device.

The middleware 1030 may include a middleware module that forms a combination of various functions of the above-described elements. The middleware 1030 may provide a module specialized for each type of OS to provide a differentiated function. Also, the middleware 1030 may delete some of the existing elements, or may add new elements The API 1060 (e.g., the API 845) may be, for example, a set of API programming functions, and may be provided with a different configuration according to an OS. For example, in the case of Android® or iOS®, one API set may be provided for each platform. In the case of Tizen®, two or more API sets may be provided for each platform.

The application 1070 (e.g., the application program 847) may include, for example, one or more applications which can provide functions such as a home application 1071, a dialer application 1072, an short messaging system (SMS)/multimedia messaging system (MMS) application 1073, an instant messaging application (IM) 1074, a browser application 1075, a camera application 1076, an alarm application 1077, a contact application 1078, a voice dial application 1079, an e-mail application 1080, a calendar application 1081, a media player application 1082, an album application 1083, a timepiece application 1084, a payment 1085, a health care application (e.g., an application to measure a quantity of exercise or blood sugar level), or an environmental information application (e.g., an application for providing atmospheric pressure, humidity, or temperature information).

According to an embodiment of the present disclosure, the application 1070 may include an application (hereinafter, for the sake of convenience of explanation, referred to as an "information exchange application") supporting information exchange between the electronic device (e.g., the electronic device 801) and the external electronic device (e.g., the electronic devices 802 and 804). The information exchange application may include, for example, a notification relay application for transferring certain information to an external electronic device or a device management application for managing an external electronic device.

For example, the notification relay application may include a function of transferring, to the external electronic device (e.g., the electronic device 802 or 804), notification information generated from other applications (e.g., an SMS/MMS application, an e-mail application, a health management application, or an environmental information application) of another electronic device. Further, the notification relay application may receive notification information from, for example, an external electronic device and provide the received notification information to a user.

For example, the device management application may manage (e.g., install, delete, or update) at least one function (e.g., a function of turning on/off the external electronic device (or some components) or a function of adjusting luminance (or resolution) of a display) of the external electronic device (e.g., the electronic device 802 or 804) communicating with the electronic device, applications operating in the external electronic device, or services (e.g., a call service and a message service) provided by the external electronic device.

According to an embodiment, the application 1070 may include applications (e.g., a health care application of a mobile medical appliance or the like) designated according to attributes of the external electronic device (e.g., the electronic device 802 or 804). According to an embodiment, the application 1070 may include an application received from the external electronic device (e.g., the server 806 or the electronic device 802 or 804). The application 1070 may include a preloaded application or a third party application which can be downloaded from the server. Names of the elements of the program module 1010, according to the above-described embodiments of the present disclosure, may change depending on the type of OS.

According to various embodiments, at least some of the program module 1010 may be implemented in software, firmware, hardware, or a combination of two or more thereof. At least some of the program module 1010 may be implemented (e.g., executed) by, for example, the processor (e.g., the processor 910). At least some of the program module 1010 may include, for example, a module, a program, a routine, a set of instructions, and/or a process for performing one or more functions.

The term "module" used herein may represent, for example, a part including one or more combinations of hardware, software and firmware. The term "module" may be interchangeably used with the terms "part", "logic", "logical block", "component" and "circuit". The "module" may be a minimum part of an integrated component or may be a part thereof. The "module" may be a minimum part for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in a computer-readable storage media in the form of a program module. The instruction, when executed by a processor (e.g., the processor 920), may cause the one or more processors to perform a function corresponding to the instruction. The computer-readable storage media, for example, may be the memory 930.

A computer-readable recording medium may include a hard disk, a floppy disk, a magnetic media (e.g., a magnetic tape), an optical media (e.g., a compact disc-ROM (CD-ROM) and a DVD, a magneto-optical media (e.g., a floptical disk)), and hardware devices (e.g., a ROM, a RAM, or a flash memory). Also, a program instruction may include not only a mechanical code such as things generated by a compiler but also a high-level language code executable on a computer using an interpreter. The above hardware part may be configured to operate via one or more software modules for performing an operation according to various embodiments, and vice versa.

A module or a program module according to various embodiments may include at least one of the above elements, or a part of the above elements may be omitted, or additional other elements may be further included. Operations performed by a module, a program module, or other elements according to various embodiments may be executed sequentially, in parallel, repeatedly, or in a heuristic method. In addition, some operations may be executed in different sequences or may be omitted. Alternatively, other operations may be added.

According to embodiments disclosed in the present disclosure, after the electronic device is first booted up, if the specified condition is satisfied, the content specified by the purchaser is output, and therefore the purchaser may give a message, which the purchaser wants, to the user of the electronic device, and a new type of out-of-box experience (OOBE) may be provided to the user.

In addition, the apparatus may provide a variety of effects ascertained directly or indirectly through the present disclosure.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   a display;
   a communication circuit communicating with a server through a network;
   a memory configured to store information associated with a connection of the electronic device and the network; and
   a processor electrically connected with the memory, the display and the communication circuit and configured to:
      determine whether the electronic device is booted for a first time or not based on the information,
      if the electronic device is booted up for the first time, transmit identification information of the electronic device and a request for transmitting content corresponding to the identification information to the server using the communication circuit,
      receive the content corresponding to the identification information from the server using the communication circuit,
      change the information to indicate that a connection of the electronic device to the network is not for the first time, and
      output the content corresponding to the identification information on the display.

2. The electronic device of claim 1,
   wherein the information includes a flag, and
   the processor is further configured to:
      determine whether the electronic device is connected with the network for the first time, based on the flag, and
      change the flag when the electronic device connects with the network for the first time.

3. The electronic device of claim 2, wherein the flag is stored in a safety area of the memory, which is protected when the electronic device is initialized.

4. The electronic device of claim 1,
   wherein the information includes a log including a connection history of the electronic device to the network, and
   wherein the processor is further configured to determine whether the electronic device is connected with the network for the first time or not based on the log if the electronic device is connected with the network.

5. The electronic device of claim 1,
   wherein the communication circuit includes a Bluetooth module, and
   wherein the processor is further configured to:
      transmit the identification information and the transmission request to the server through an external device when the electronic device is connected with the network for the first time by pairing the electronic device with the external device through the Bluetooth module, and
      receive the content corresponding to the identification information from the server through the external device.

6. The electronic device of claim 1, wherein the communication circuit includes at least one of a Wi-Fi module or a cellular module.

7. The electronic device of claim 1, wherein the processor is further configured to:
   receive the content corresponding to the identification information and an output condition of the content corresponding to the identification information from the server using the communication circuit, and
   output the content corresponding to the identification information on the display if the output condition is satisfied.

8. The electronic device of claim 1, wherein the identification information includes a serial number (S/N) assigned to the electronic device upon manufacturing of the electronic device.

9. The electronic device of claim 1, wherein the processor is further configured to:
   store the content corresponding to the identification information in the memory if the content corresponding to the identification information is received from the server, and
   delete the content corresponding to the identification information after the content corresponding to the identification information is output.

10. A system for providing a message, the system comprising:
    a server; and
    an electronic device connected with the server through a network,
    wherein the server is configured to:
       provide a web page obtaining content corresponding to the electronic device, and
       store the content corresponding to the electronic device obtained through the web page, and
    wherein the electronic device is configured to:
       determine whether the electronic device is booted for a first time or not based on the information stored in the electronic device,
       if the electronic device is booted up for the first time, transmit a request for transmitting the content corresponding to the electronic device to the server,
       change the information to indicate that a connection of the electronic device to the network is not for the first time, and
       output the content corresponding to the electronic device as the message through at least one of a display or a speaker when a specified condition is satisfied.

11. The system of claim 10, wherein the specified condition includes at least one of a first connection of the network, booting, or a specified time.

12. The system of claim 10, wherein the server is further configured to obtain identification information corresponding to the electronic device from a database storing a plurality of identification information respectively corresponding to a plurality of electronic devices.

13. The system of claim 10,
wherein the electronic device is further configured to transmit the transmission request and identification information of the electronic device to the server, and
wherein the server is further configured to:
  receive a request for ordering the electronic device from another electronic device,
  store the identification information of the electronic device and the content matched with the identification information, and
  transmit the content corresponding to the electronic device based on the identification information to the electronic device.

14. The system of claim 13, wherein the server is further configured to obtain the identification information based on the order request.

15. The system of claim 13, wherein server is further configured to obtain the identification information based on account information associated with the order request.

16. The system of claim 10, wherein the server is further configured to search for the content corresponding to the electronic device stored in the server, in response to the transmission request.

17. The system of claim 10, wherein the server is further configured to:
  store the content corresponding to the electronic device and the specified condition obtained through the web page, and
  transmit the content corresponding to the electronic device to the electronic device when the transmission request is received and the specified condition is satisfied.

18. The system of claim 10,
wherein the server is further configured to transmit the content corresponding to the electronic device and the specified condition to the electronic device, in response to the transmission request, and
wherein the electronic device is further configured to receive and store the content corresponding to the electronic device and the specified condition from the server.

19. A method of providing a message, the method comprising:
  receiving, by a server, a request for ordering an electronic device from another electronic device;
  providing, by the server, a web page for obtaining content corresponding to the electronic device, to the other electronic device;
  storing, by the server, the content obtained through the web page, identification information of the electronic device, and an output condition of the content;
  determining, by the electronic device, whether the electronic device is booted for a first time or not based on information associated with a connection of the electronic device and a network;
  transmitting to the server, by the electronic device, the identification information and a request for transmitting the content if the electronic device is booted up for a first time;
  transmitting, by the server, the content to the electronic device if the output condition is satisfied;
  changing, by the electronic device, the information to indicate that a connection of the electronic device to the network is not for the first time; and
  outputting, by the electronic device, the content as the message.

20. The method of claim 19, wherein the transmitting of the request for transmitting the content comprises:
  transmitting the identification information and the request for transmitting the content to the server when the electronic device is connected with the network for the first time.

* * * * *